Sept. 29, 1970

D. B. PECK 3,531,699

METALLIZED ELECTRICAL CAPACITOR

Filed May 19, 1969

3,531,699
METALLIZED ELECTRICAL CAPACITOR

David B. Peck, Williamstown, Mass., assignor to Sprague Electric Company, North Adams, Mass., a corporation of Massachusetts
Filed May 19, 1969, Ser. No. 825,679
Int. Cl. H01g 3/21, 3/215
U.S. Cl. 317—258                5 Claims

ABSTRACT OF THE DISCLOSURE

A pair of double-metallized porous electrodes is convolutely wound with dielectric resin film spacers. The winding is impregnated with a liquid hydrocarbon, with the exposed surface layer of the impregnant being converted to a solid state while the impregnant within the winding remains liquid. The winding is encased in a hydrocarbon resin having a coefficient of thermal expansion less than that of the impregnated winding.

BACKGROUND OF THE INVENTION

This invention relates to metallized electrical capacitors, and more particularly to such capacitors manufactured with impregnated metallized electrodes.

The use of "double" metallized paper electrodes in combination with suitable plastic film dielectric materials is known to the capacitor art. For example, in U.S. Letters Patent 3,346,789 there is disclosed such a system utilizing polymerized resin as a dielectric impregnant for the capacitor. Such a capacitor has the desired self-healing characteristics, but because of the minute void formations which occur on polymerization and shrinking of the impregnant it has been found that the corona starting voltage is relatively low. This characteristic prevents broad usage of the described capacitor system in alternating current capacitors. Even though short circuits do not occur, the corona continues in the voids and leads to eventual deterioration and failure of the capacitor.

On the other hand, a fully liquid impregnated system, which is desirable to avoid corona formation, makes it necessary to seal the capacitor in a metal can with one or more cover insulating elements. Such a canned capacitor can be expected to operate satisfactorily, assuming the use of properly chosen electrodes, dielectric films, and impregnants. However, there is a shock hazard present due to the use of the metal can, and especially the electrical capacity between the electrodes and the terminals of the capacitor section to the metal container. This shock hazard has necessitated the need for an external insulating jacket or expensive tape applied to the outside surfaces of the metal container.

SUMMARY OF THE INVENTION

It is an object of the present invention to overcome the foregoing and related disadvantages of the prior art.

A further object is to produce fully insulated metallized capacitors that are especially suited for alternating current application.

A still further object is to produce metallized AC capacitors characterized by unusually low electrical losses and high volumetric efficiency.

In accordance with this invention a metallized electrical capacitor is produced comprising at least two electrodes which consist of a fibrous dielectric substrate on both surfaces of which are deposited conducting metallic layers of from about 200 to about 800 angstroms in thickness. The electrodes are convolutely wound with and separated by a predominantly hydrocarbon resin dielectric film, and the winding is impregnated with a liquid predominantly hydrocarbon material whose exposed surface layer is polymerized to a solid state.

In a more restricted sense, this invention is concerned with the above construction whereby the impregnated capacitor is encased in an insulating housing of a predominantly hydrocarbon thermoplastic resin whose thermal expansion coefficient is less than that of said dielectric resin film.

In one of the limited embodiments of the invention, said dielectric film consists of polypropylene resin, said impregnant consists of liquid polybutadiene, and said encapsulating resin consists of polypropylene containing an inert filler.

DESCRIPTION OF THE INVENTION

Figure 1:
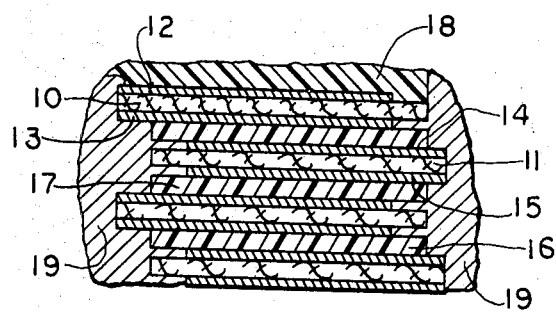
FIG. 1 is a cross-section of a portion of a rolled capacitor of this invention.

In FIG. 1 of the drawing, 10 and 11 represent fibrous electrode substrates, consisting of porous material such as paper, or, in one of the preferred embodiments of the invention, porous fibrous polypropylene paper. On both surfaces of substrates 10 and 11 are deposited thin metal electrode layers; 12 and 13 on substrate 10, and 14 and 15 on substrate 11. The two metal layers on each porous substrate constitute only a single electrode, with the substrate serving only as a carrier for the electrode that is capable of being impregnated.

The dielectric film is shown as 16 and 17, providing the electrical isolation between the metallized electrodes. The metallized electrodes and films are convolutely wound in extended electrode fashion with an edge of one electrode extending from one end of the winding and an edge of the other electrode extending from the other end of the winding. Termination to the opposing electrode extensions is provided by metallic end spray 19 and 19'.

The capacitor winding is impregnated with a liquid dielectric material, predominantly hydrocarbon in nature and preferably a member of the polyolefin or di-olefin family. This impregnant remains as a liquid within the capacitor while, in accordance with this invention, the outer surface 18 is polymerized by heat, oxygen and/or catalysts to a solid state, thereby protecting the capacitor from egress of the liquid dielectric impregnant. This layer also provides an intimate bonding surface for subsequent encapsulation.

Figure 2:
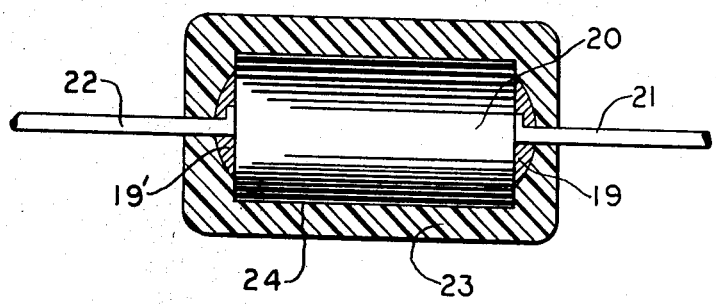
FIG. 2 shows a simplified cross-section of the encapsulated capacitor of this invention.

The capacitor section 20 of FIG. 2 is a rolled construction of the type shown in FIG. 1. Terminals 21 and 22 extend from the ends of the capacitor section. The capacitor is encapsulated, and except for the terminations, totally surrounded by insulating material 23, which adheres closely to and is bonded to the capacitor section 20 at the interface 24. In accordance with the preferred embodiment of the invention, the thermal coefficient of expansion of said casing material must be lower than that of the capacitor section (which in turn reflects the dielectric film, the metalized electrodes and the impregnant).

When such a relationship of expansion coefficients is maintained, it has been found that the corona starting voltage is maintained at a significantly higher level over a wide temperature range than in a similar capacitor wherein the housing does not exhibit the compressive containing force on the capacitor section.

It has been found that the configuration shown in FIG. 2, when the thermal expansion relationships are as prescribed, is also useful in other liquid impregnated capacitors whose outer surface is converted to a solid state. For example, dehydrated castor oil and cashew nut oil. The invention, to the extent that these impregnants are involved, is only applicable when the thermoplastic casing fulfills the prescribed requirements.

In order to produce a long life capacitor substantially free from corona and to possess the self-healing feature, the evaporated or otherwise produced electrode layers should be of sufficient thinness to permit volatilization during the occurrence of a short circuit or flow of current through a weak spot in the dielectric. For this purpose, electrode thicknesses on the order of 200 to 800 angstroms are desirable. Aluminum and zinc are suitable electrode materials, although others may be employed.

The porous substrate ideally is a paper made of fibers of the same resin as the dielectric film, such as polypropylene. However, good results are obtained when cellulose paper is employed. Rather than the high density normally used when paper forms part of the dielectric system, as in the case of a conventional capacitor, I prefer to employ a very low density paper in order to maximize the amount of liquid impregnant which can be introduced into the capacitor section. In the case of cellulose paper, densities on the order of 0.7 to 0.98 are desirable; while with polypropylene paper, densities of 0.55 to 0.75 are preferred.

The thickness of the porous substrate may vary from about 5 microns to about 12 microns. In the case of the very thinnest substrates, and when density is low, the electrode layers will contact each other during the deposition process. In such an instance, it is usually desirable to reduce the thickness of each electrode layer to assure a self-healing characteristic.

The preferred dielectric films of the invention are the predominantly hydrocarbon series classified as polyolefins. These include polyethylene, polybutylene, polypropylene, etc. The preferred dielectric film is polypropylene with molecular weight in excess of 125,000 and preferably more than 200,000.

The impregnant is selected from the class containing unsaturated hydrocarbons, with molecular weight usually on the order of 1000 to 15,000, and characterized by the ability to be polymerized to a solid state on the surface of the capacitor. This may be accomplished by heat, oxidation and/or catalysts applied to the surface only. A suitable material is polybutadiene with a molecular weight on the order of 7000. Such an impregnant is low enough in viscosity to permit impregnation at a modestly elevated temperature such as 80° C., and it may be polymerized on the surface to a solid state by exposure to peroxide catalysts and heat.

The impregnant may contain saturated plasticizing hydrocarbon materials, but in such an instance, the boiling point and/or vapor pressure must be sufficiently high to prevent volatilization in the capacitor during operation of the latter.

The encapsulating housing resin is preferably thermoplastic in nature and selected from the class containing essentially pure hydrocarbon resins, characterized by excellent resistance to humidity. In order to secure an intimate bonding to the capacitor and surface of the impregnant, members of the same generic hydrocarbon resin family are preferred.

For example, with a capacitor employing polypropylene as the dielectric film and polybutadiene as the impregnant, I prefer to employ polypropylene, injection molded about the capacitor, as the casing material. To secure optimum properties, especially high corona starting voltage over a wide temperature range, I prefer to employ a polypropylene molding compound with some inert filler, which also with proper selection from known fillers will add to the fire retardancy of the system. The higher density of the filled molding resin also contributes to improved dissipation of what little heat is generated in the capacitor during its operation, and the reduction of the thermal coefficient of expansion.

As a general rule, I prefer to use, in the case of a polypropylene dielectric film capacitor, a polypropylene molding compound whose thermal expansion coefficient is $5.0 \times 10^{-5}$ per degree C or less.

What is claimed is:

1. A metallized electrical capacitor comprising a pair of double-metallized porous electrodes, dielectric resin films convolutely wound with and separating said electrodes, the winding of electrodes and films being impregnated with a liquid hydrocarbon dielectric material, the exposed surface layer of said material being in a solid state and said material within said winding being in a liquid state, and said winding being encased in a hydrocarbon resin having a coefficient of thermal expansion less than that of the impregnated winding.

2. The capacitor of claim 1 wherein said films, said material, and said resin are members of the same generic hydrocarbon family.

3. The capacitor of claim 2 wherein said films are polypropylene, said material is polybutadiene, and said resin is polypropylene containing an inert filler.

4. The capacitor of claim 3 wherein said surface layer of said material is an in situ polymerized layer, and said resin is an injection-molded casing around said impregnated winding and bonded to said layer.

5. The capacitor of claim 1 wherein said electrodes are porous fibrous polypropylene paper having thin deposited metal layers on both surfaces thereof.

References Cited

UNITED STATES PATENTS 3,346,789  10/1967  Robinson _____ 317—258

ELLIOTT A. GOLDBERG, Primary Examiner

U.S. Cl. X.R.

264—272; 317—260